United States Patent
Bowron

(10) Patent No.: US 9,776,088 B2
(45) Date of Patent: Oct. 3, 2017

(54) APPARATUS AND METHOD OF USER INTERACTION

(71) Applicant: Sony Computer Entertainment Europe Limited, London (GB)

(72) Inventor: Paul-Jon Bowron, London (GB)

(73) Assignee: Sony Interactive Entertainment Europe Limited (GB)

( * ) Notice: Subject to any disclaimer, the term of this patent is extended or adjusted under 35 U.S.C. 154(b) by 212 days.

(21) Appl. No.: 14/817,313

(22) Filed: Aug. 4, 2015

(65) Prior Publication Data

US 2016/0045828 A1 Feb. 18, 2016

(30) Foreign Application Priority Data

Aug. 12, 2014 (GB) .................................. 1414296.2

(51) Int. Cl.
 A63F 9/24 (2006.01)
 A63F 13/56 (2014.01)
 (Continued)

(52) U.S. Cl.
 CPC ............ *A63F 13/56* (2014.09); *A63F 13/352* (2014.09); *A63F 13/44* (2014.09); *A63F 13/497* (2014.09);
 (Continued)

(58) Field of Classification Search
 CPC .................................. A63F 13/00; A63F 13/12
 See application file for complete search history.

(56) References Cited

U.S. PATENT DOCUMENTS

| 5,354,202 A | 10/1994 | Moncrief et al. |
| 8,100,771 B2 * | 1/2012 | Maeda .................... A63F 13/12 463/40 |

(Continued)

FOREIGN PATENT DOCUMENTS

| EP | 1757341 A1 | 2/2007 |
| JP | 2003320164 A | 11/2003 |
| JP | 2005058383 A | 3/2005 |

OTHER PUBLICATIONS

United Kingdom combined Search Report for Application No. GB1414296.2 dated Aug. 25, 2015.

(Continued)

*Primary Examiner* — Reginald Renwick
(74) *Attorney, Agent, or Firm* — Lerner, David, Littenberg, Krumholz & Mentlik, LLP

(57) ABSTRACT

A method obtains multiple recorded instances of play through a virtual environment and generating the virtual environment through which progress may be made by a player. At a first elapsed time, a position of the player is determined within the virtual environment. At the first elapsed time, data indicating a position within the virtual environment is obtained, and a difference between the obtained position and the determined position of the player is calculated. If the difference exceeds a first threshold, the method searches for a second recorded instance of play meeting criteria where, at the first elapsed time, the data indicates a position within the environment whose difference from the determined position does not exceed a second threshold. If a second recorded instance of play meets the criteria, a graphical element is incorporated into the environment at the position obtained from the first elapsed time within the second recorded instance.

16 Claims, 5 Drawing Sheets

(51) Int. Cl.
A63F 13/497 (2014.01)
A63F 13/67 (2014.01)
A63F 13/352 (2014.01)
A63F 13/44 (2014.01)
A63F 13/798 (2014.01)
A63F 13/825 (2014.01)
A63F 13/803 (2014.01)

(52) U.S. Cl.
CPC ............ *A63F 13/67* (2014.09); *A63F 13/798* (2014.09); *A63F 13/825* (2014.09); *A63F 13/803* (2014.09)

(56) References Cited

U.S. PATENT DOCUMENTS

| | | |
|---|---|---|
| 2006/0135236 A1 | 6/2006 | Sato et al. |
| 2007/0060359 A1* | 3/2007 | Smith ................ A63F 13/5258 463/42 |
| 2008/0167121 A1 | 7/2008 | Maeda et al. |
| 2009/0093313 A1 | 4/2009 | Yabuki et al. |
| 2009/0208181 A1 | 8/2009 | Cottrell |
| 2010/0035689 A1 | 2/2010 | Altshuler et al. |
| 2011/0092282 A1* | 4/2011 | Gary ...................... A63F 13/12 463/31 |
| 2011/0281638 A1* | 11/2011 | Bansi ...................... A63F 13/69 463/23 |

OTHER PUBLICATIONS

Extended European Search Report for Application No. EP15179745 dated May 19, 2016.
United Kingdom Combined Search and Examination Report for Application No. GB1414296.2 dated Feb. 11, 2015.

\* cited by examiner

| Race 1201 | ID | Completion Time | Data |
|---|---|---|---|
| | 1110 | 0:55 | <$x_1,y_1,r_1,s_1$><$x_2,y_2,r_2,s_2$>... |
| | 1111 | 0:58 | <$x_1,y_1,r_1,s_1$><$x_2,y_2,r_2,s_2$>... |
| | 1112 | 1:01 | <$x_1,y_1,r_1,s_1$><$x_2,y_2,r_2,s_2$>... |
| | 1113 | 1:06 | <$x_1,y_1,r_1,s_1$><$x_2,y_2,r_2,s_2$>... |
| | 1114 | 1:13 | <$x_1,y_1,r_1,s_1$><$x_2,y_2,r_2,s_2$>... |
| | 1115 | 1:22 | <$x_1,y_1,r_1,s_1$><$x_2,y_2,r_2,s_2$>... |
| Race 1202 | ID | Completion Time | Data |
| | 1120 | 2:48 | <$x_1,y_1,r_1,s_1$><$x_2,y_2,r_2,s_2$>... |
| | 1121 | 3:02 | <$x_1,y_1,r_1,s_1$><$x_2,y_2,r_2,s_2$>... |
| | 1122 | 3:19 | <$x_1,y_1,r_1,s_1$><$x_2,y_2,r_2,s_2$>... |
| | 1123 | 3:35 | <$x_1,y_1,r_1,s_1$><$x_2,y_2,r_2,s_2$>... |

Figure 3

APPARATUS AND METHOD OF USER INTERACTION

CROSS REFERENCE TO RELATED APPLICATIONS

The present application claims the benefit of and priority to GB Application No. 1414296.2, filed Aug. 12, 2014, the entire disclosure of which is incorporated by reference herein.

BACKGROUND OF THE INVENTION

Field of the Invention

The present invention relates to an apparatus and method of user interaction.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In conventional videogames, there are genres where it is known to use so-called 'ghosts', which are recordings of a user's previous attempts at a challenge provided by the videogame, typically displayed as a translucent representation of the player's avatar within the virtual environment of game. The user can then judge their own performance against that of the ghost's during play.

The most common use of such a ghost is to record the user's current best performance within the videogame, thereby providing them with a well-matched challenge to improve upon this performance. However, when the user has difficulty replicating their best performance, this ghost can become frustrating.

Consequently there is scope to provide a ghost function giving rise to a better user experience.

The present invention seeks to alleviate or mitigate this need.

SUMMARY OF THE INVENTION

In a first aspect, a method of user interaction with an entertainment device is provided in accordance with claim 1.

In another aspect, a method of selecting a plurality of recorded instances of play at a server for interaction with a user at an entertainment device is provided in accordance with claim 8.

In another aspect, an entertainment device is provided in accordance with claim 13.

In another aspect the server is provided in accordance with claim 15.

Further respective aspects and features of the invention are defined in the appended claims.

It is to be understood that both the foregoing general summary of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a schematic diagram of ghost recordings in accordance with embodiments of the present invention;

DESCRIPTION OF THE EMBODIMENTS

An apparatus and method of user interaction are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Entertainment Device

Figure 1:
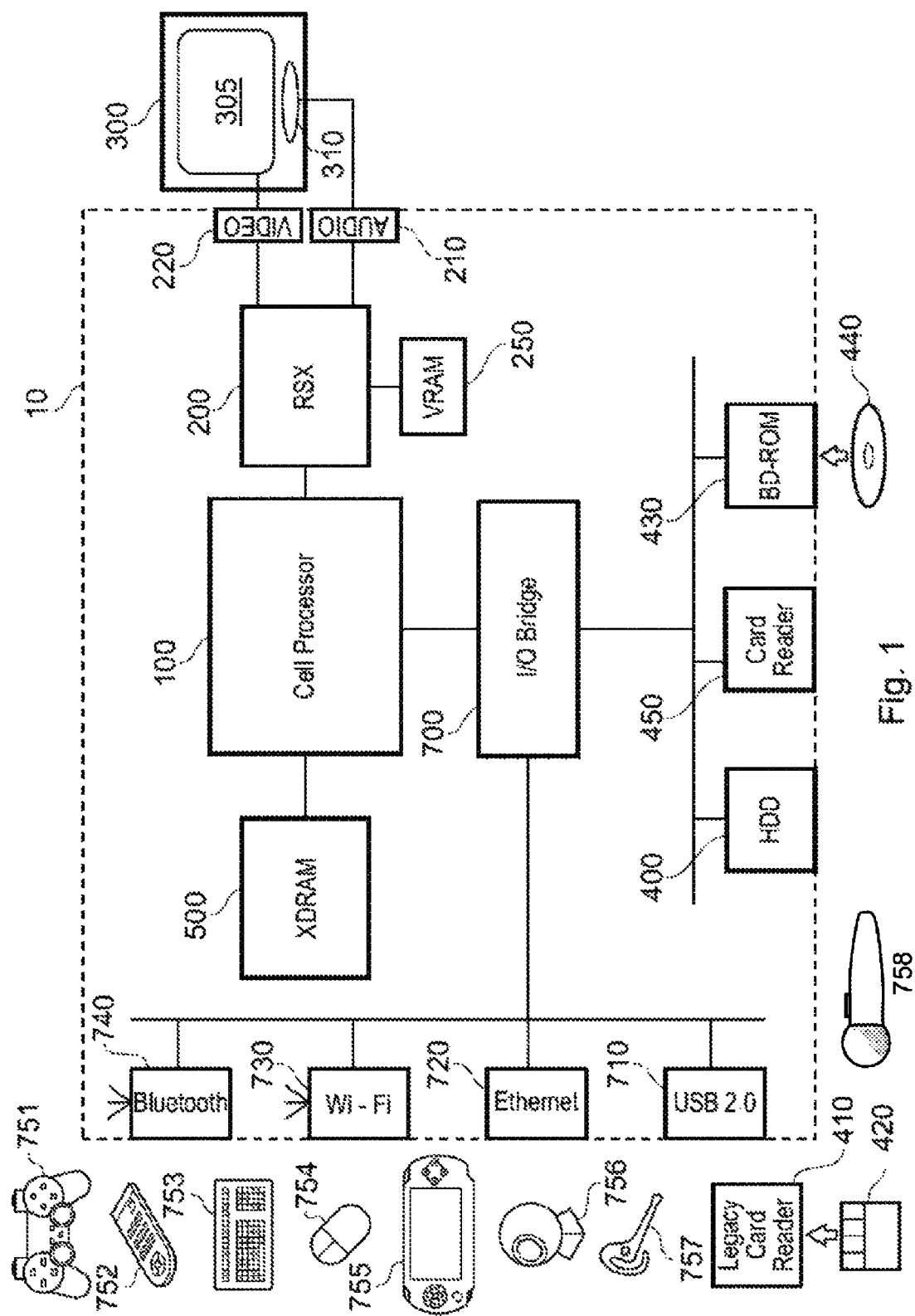
FIG. 1 is a schematic diagram of an entertainment device.

FIG. 1 schematically illustrates the overall system architecture of the Sony® Playstation 3® entertainment device, which is suitable as an entertainment device for generating the video images of a virtual environment that incorporate ghosts. However, it will be appreciated that other entertainment devices such as the PlayStation 4® or a suitably equipped personal computer could also be used for generating the video images of a virtual environment that are used by a head mounted display.

Referring to FIG. 1, a system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the PlayStation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Display of a Virtual Environment

Figure 2:
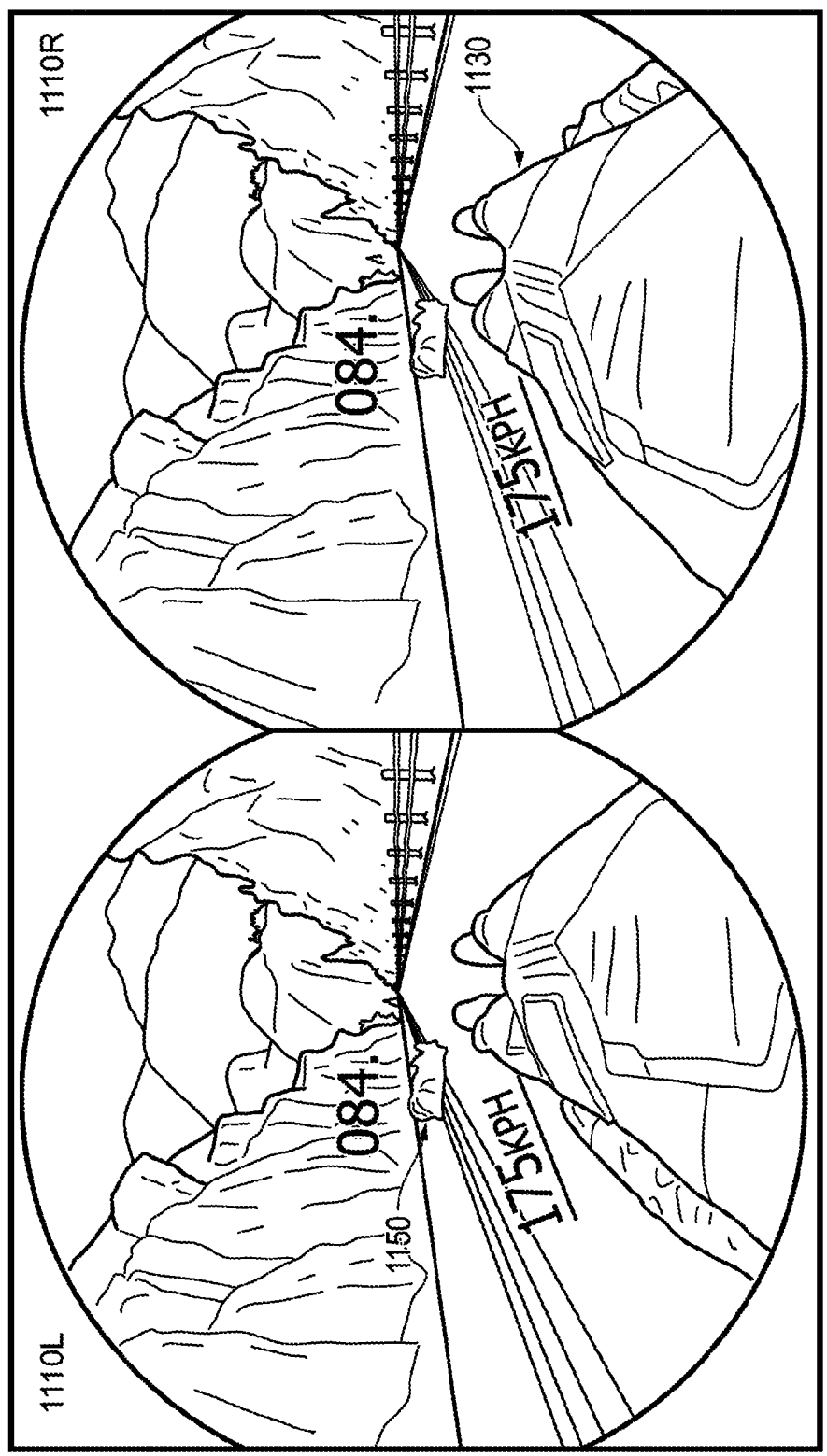
FIG. 2 is an illustration of a videogame image in accordance with embodiments of the present invention.

Referring now to FIG. 2, in an embodiment of the present invention the entertainment device generates a virtual environment and renders it for display to a user. In the example shown in FIG. 2 the user is playing 'VR Luge', a game in which they attempt to steer themselves down a mountainous track at increasing speeds whilst avoiding various hazards. It will be appreciated that this game is a non-limiting example.

The entertainment device can render a game as a conventional 2D image for use with a television. Typically in these circumstances the user can control the game with a conventional handheld controller such as a Sony SIXAXIS® controller, or a motion controller such as the Sony Move® controller. Optionally control may be achieved by voice commands through a microphone or physical gestures through a camera.

Alternatively or in addition to a conventional 2D image, the entertainment device can render a game as a stereoscopic pair of images (1110R,L) for output to a head-mounted display as shown in FIG. 2. The stereoscopic pair of images may be pre-warped (as shown) by the entertainment device's graphics unit 200 to account for known optical distortions of the displayed image that are observed when wearing the head-mounted display. In this case, the user perceives this stereoscopic pair of images as a single game image and in practice would experience immersive depth while viewing the perceived single image. Whilst in these circumstances the user may still operate conventional controllers, they may for example steer themselves by moving their head to the left or the right; hence in the example VR Luge game this can be used to signify the shift of weight used when steering a real luge board.

In the illustrated example, the user is represented by an avatar (1130) which is viewed in-game from the position of the avatar's head. However it is envisaged that the user could be represented in any suitable way, or in the case of a so-called first person shooter may not be represented in the displayed image at all.

Ghost Recordings

In an embodiment of the present invention, as a user navigates the environment during play, a recording of a different instance of play is accessed and used to display a ghost player within the environment that replicates the different instance of play in the recording. Such recordings may be referred to as 'ghost recordings'.

The ghost player is typically represented on-screen as a ghost of a second avatar (1150) that may be similar to the user's avatar or may represent a different, competitor avatar. In the illustrated example of FIG. 2 the ghost is represented as a series of glowing outlines. Typically the ghost will be semi-transparent so that it does not occlude goals and/or hazards from the user. The specific appearance of the ghost can be a matter for the designer of the game.

At the start of the challenge, the user and the ghost begin at the same position (optionally the ghost's position may be laterally offset to initially appear next to the user, with the applied offset being reduced as a function of distance over a first predetermined portion of the challenge).

Once the challenge starts, the user begins their play of the game and at the same time the state of the ghost within the game environment is updated according to the ghost recording.

To provide the required state information, the ghost recording may comprise $<x_t,y_t>$ coordinates indicating the position of the ghost at successive moments t, for example at intervals equivalent to the displayed frame rate. In the case of a challenge that follows a predetermined path, the coordinates can be simplified to a position $y_t$ along the path together with a lateral (or other salient) offset $x_t$ relative to the centreline of the path, and optionally also an indication of the avatar's orientation/rotation $r_t$ either with respect to a fixed frame of reference or with respect to the centreline of the path at the indicated position. It will be appreciated that such values could be efficiently recorded as incremental vectors, although any suitable recording scheme may be considered.

Similarly any other desired state of the avatar (for example a damage status used to modify the appearance of the ghost) can be included in the ghost recording.

Where in order to reduce the data size of the ghost recording the recording intervals are less frequent than the rendered frame rate interval, the position and orientation of the rendered ghost can be interpolated for a rendering between intervals from the available data.

It will be appreciated that the apparent speed of the ghost is therefore generated by its change of position with respect to the successive recording intervals. However a ghost recording may also periodically include explicit speed data $s_t$, either at each interval or at a lower periodicity.

In this way a ghost player can be provided as a competitor for the real player during their attempt at the challenge.

Adaptive Ghost Selection

Conventionally the ghost recording used in such a challenge is one associated with the best time previously achieved by the player of the game. However as noted above, sometimes this recording will not be well-matched with the current performance of the player, resulting in frustration either because the ghost is left behind and no longer provides a visible challenge, or because the ghost pulls so far ahead of the player that it is lost from view and no longer provides a visible challenge.

Turning now to FIG. 3, accordingly in an embodiment of the present invention a plurality of ghost recordings (1110-5, 1120-3) are stored in a memory (400, 500) of the entertainment device in association with a given challenge within a game (for example in association with a particular race course (1201, 1202), or between two particular waypoints or branch points on a branching path, or the like).

As will be discussed in detail later herein, these ghost recordings may be obtained by recording a plurality of plays of the challenge on the entertainment device, or may be pre-recorded and provided with the game, or may be obtained from an online server based on one or more filter criteria discussed later, or may be a combination of any or all of these.

In any event, it can be assumed that the ghost recordings span a range of degrees of skill when playing the challenge, and also represent a range of completion times for the challenge.

Consequently for a given position within a challenge there will be recordings of ghosts travelling at different speeds, and for a given elapsed time after the start of the challenge there will be recordings of ghosts at different positions.

In a first play of a particular challenge by a user, an arbitrary first ghost recording may be selected to provide an on-screen ghost. Optionally the first ghost recording having a completion time closest to an average completion time among the available recordings may be selected to provide an assumed reasonable match with the player, who skill is initially unknown. However such a selection may be modified in response to difficulty setting of the game chosen by the player; for example in an easy mode the ghost recording having a completion time closest to the bottom $25^{th}$ percentile point may be chosen, whilst in a difficult mode the ghost recording and a completion time closest to the top $25^{th}$ percentile point may be chosen. The specific difficulty settings and associated percentiles can be selected at the discretion of a designer of the game.

Potentially the selected first ghost recording may provide a well matched and entertaining competitor ghost for the player. However as noted above it is possible that the first ghost may either race ahead of the player or fall behind them to an extent that it no longer provides well matched competition.

In the first case, in which the first ghost races ahead of the player, in an embodiment of the present invention if the first ghost exceeds a predetermined threshold distance ahead of the player (for example 50 m ahead of the player has measured within the virtual environment), then a second ghost recording is selected containing a second ghost whose position at the current elapsed time is behind the player, within a predetermined distance (for example 10 m), but whose speed at the current elapsed time is greater than that of the player.

This pair of selection criteria for the second ghost (currently close behind the player, but faster) provides for a replacement or supplementary second ghost that can be introduced to the environment behind the player, thereby not creating an initial distraction with their appearance, but which is likely to overtake the player soon after being introduced. Moreover, the selection criteria identify a second ghost recording in which the instance of play is of comparable skill to the current player but being played slightly differently, thereby providing a better matched competitor for the player than the first ghost currently racing ahead of them.

Once a new ghost has been added to the game, the first ghost can be removed (either immediately or using a fading transition), or can be allowed to continue until it reaches a second threshold distance ahead of the player, at which point it can be removed (again either immediately or using a fading transition). Alternatively or in addition the first ghost can be removed when it is next occluded by an element of the environment (for example if it turns a corner and disappears behind a hill).

In the second case in which the first ghost falls behind the player, then in an embodiment of the present invention if first ghost exceeds a predetermined threshold distance behind the player (for example 10 m by the player has measured within the virtual environment), then again a second ghost recording is selected containing a second ghost whose position at the current elapsed time is behind the player, within a predetermined distance (for example 10 m), but whose speed at the current elapsed time is greater than that of the player. Hence again the same selection criteria can be used to provide a replacement or supplementary second ghost to introduce behind the player but which is likely to appear in front of them soon after.

Alternatively or in addition, a second ghost recording is selected containing a second ghost whose position at the current elapsed time is in front of the player up to a predetermined distance (for example 50 m), but whose speed at the current elapsed time is less than that of the player. Hence in this case the selection criteria provide for a replacement or supplementary second ghost that can be introduced in front of the player at a distance that does not cause visual confusion (for example, the distance can be selected so that the second ghost is rendered at a predetermined relative size in relation to the overall image), but whose speed will allow the player to begin catching up with them.

Hence more generally in the event that a first ghost's relative distance with respect to the player falls outside first predetermined threshold distances, then a second ghost is selected who, at the currently elapsed time, has a relative distance with respect to the player that is inside second predetermined threshold distances, and whose relative velocity with respect to the player is towards the player (i.e. slower than the player if ahead, faster than the player if behind).

Typically the second predetermined threshold distances will be the same as the first predetermined threshold distances or shorter.

It will be appreciated that where multiple ghost recordings could be used based on these criteria, then optionally a ghost recording can be selected in which the relative velocity with respect to the player is less than a predetermined threshold relative velocity (optionally different depending on whether the ghost will be in front of or behind the player when introduced). The predetermined threshold is selected to be at a level that prevents the new ghost from being much faster or much slower than the player, as this would rapidly create the same problem as that caused by the first ghost.

It will be appreciated that occasionally no ghost recording fits the preferred selection criteria described above. In this case secondary or fall-back selection criteria may be used.

In this case, a second ghost recording is selected containing a second ghost whose position at the current elapsed time is within third predetermined threshold distances, but whose relative speed with respect to the player will not necessarily cause them to reduce their relative distance with respect to the player (for example if the second ghost is in front, they may be at the same speed as the player or going faster, whilst the second ghost is behind they may be at the same speed as the player or going slower).

In this case the third predetermined boundaries may for example be between the position of the player and a short distance in front of the player (for example 10 m). In this case, where more than one ghost recording meets the criteria, then the ghost recording whose relative speed is smallest compared to the player (i.e. closest to being the same as the player) is preferably selected.

Also in this case, because the second ghost may be introduced to the environment close in front of the player, then as with the beginning of the race if the second ghost has a similar lateral position to the that of the player's avatar or viewpoint, then optionally the second ghost may be laterally offset from the player when first introduced, with the lateral offset being reduced as a function of time and/or distance. For example, a lateral offset of 2 meters may be used, and this offset may be reduced to 0 over the course of 50 m travel within the game, or over the course of 10 seconds, depending for example on which approach is most applicable to the particular type of challenge. Alternatively or in addition, within a predetermined distance from the user's position the transparency of the ghost may be increased as a function of proximity, so that it fades from view as it occupies more of the screen.

In the case that no second ghost recording meets the criterion of falling within the third predetermined boundaries, then the third predetermined boundaries may be extended further in front of the player, and optionally behind the player optionally up to a predetermined maximum extent.

Finally, if no second ghost recording can be found to meet any of the above criteria, then the entertainment device can wait a predetermined period of time (for example five seconds) before again attempting selection with the preferred criteria, and subsequently fall-back criteria. Because the relative performance of each instance of play varies throughout the duration of the challenge, a ghost recording that previously did not meet any meet any of the above criteria may subsequently do so later in the challenge.

Searching Ghost Recordings

It will be appreciated that in order to select a ghost recording that meets the preferred or fall-back criteria above, it is necessary to know the position (location) and speed of candidate ghosts at the current elapsed time within a plurality of recordings.

Referring again to FIG. 3, in an embodiment of the present invention each race or challenge is associated with a plurality of ghost recordings that may have respective IDs (1110-1115, 1120-1123). Each ghost recording in turn comprises state data for successive intervals indicating a ghost position $<x_t,y_t>$ as discussed above and optionally also an orientation $r_t$, for example indicated by an angle based on an absolute or relative frame of reference.

In principle the data can be structured so that state data for a particular interval can be accessed across the plurality of recordings in a race; for example each recording may have a given start address, and data for each interval can be made a fixed amount, and so the data for a current interval for a given recording can be accessed at start_address+(fixed amount×interval number).

The position $y_t$ in each ghost recording at the current interval can be compared with the current position of the player to determine whether it meets preferred criteria, and for the subset of ghost recordings that meet the preferred criteria then the speed may be calculated by accessing the state data for the preceding (or, being potentially more representative for future play, the following) interval, and calculating the speed based upon the change of position within the time between the two intervals. Alternatively the speed $s_t$ may be explicitly recorded to avoid the need for this calculation step. Potentially the speed may not be recorded at every interval, in which case the speed value recorded nearest to the current interval may be used, or similarly an interpolation between speed values on either side of the current interval.

In any event, the speeds for the subset of ghost recordings can be compared with the speed of the current player, and as described above a ghost recording can be selected whose speed will cause the distance between it and the player to shrink.

It will be appreciated that potentially a large number of ghost recordings may be associated with a single race, making the search more processor intensive. Accordingly in an embodiment of the present invention races may be ordered according to completion time so that neighbouring races in memory representative of roughly similar levels of performance.

Then, in the case where the current ghost pulls away beyond a predetermined threshold distance in front of the user, the search for the second ghost can be limited to ghost recordings ranked below the recording of the current ghost, as on average these will be slower. For example, a first group of N recordings below the recording of the current ghost may be evaluated; if none of these meet preferred criteria, then the next group of N recordings below that, and so on until all ghost recordings below the current ghost recording having evaluated, and if none meet the preferred criteria, the process can be repeated for the fall-back criteria.

Similarly, in the case where the player pulls away from the current ghost, the search for the second ghost can be limited ghost recordings ranked above the recording of the current ghost as ravages will be faster. Again a similar scheme in which groups of recordings are successively evaluated first against a preferred criteria and then against the fallback criteria may be employed.

It will be appreciated that the moment-by-moment ranking of ghosts during a challenge may vary as different recordings will reflect different strategies of play, and that ranking by overall completion time is thus only a rough estimate of the instantaneous rank of ghosts at the moment the search is being performed. However, if instantaneous rankings are available or being computed anyway (for example to display the instantaneous rank of the ghost on-screen) then this instantaneous ranking can be used in a similar manner to that described above to prioritise searches through ghost recordings.

Obtaining Ghost Recordings

It will be appreciated that as the number of ghost recordings increases with respect to a particular challenge, the probability of not finding a ghost recording that satisfies the preferred criteria or the fall-back criteria reduces. Consequently it is preferable to obtain a large number of ghost recordings.

In the first instance, ghost recordings can be obtained from the player themselves. Typically this will automatically create a range of different recorded performances as the user improves. However it will also be appreciated that the user is often likely to perform better than any available ghost recording of their own play as their skill improves.

Accordingly in an embodiment of the present invention the game developers can include a range of ghost recordings at manufacture that span a broad range of player performance from relatively poor to extremely good. As a result the user is less likely to perform better than any ghost recording available to the entertainment device, enabling smooth operation of the above techniques.

Alternatively or in addition, to provide a social aspect to the game, ghost recordings may be obtained from other players; either directly via peer-to-peer connection, or via a server administering an online component of the game.

For example ghost recordings may be obtained from other players of the game who are on the current player's friends list, or from other players of the game within a common region (whether the region is defined as a local area network, or geographically at the scale of street, town, county, country, continent or globally), or from other players of the game having a similar demographic profile such as age and/or gender, or any suitable combination of these factors.

It will be appreciated that as many people play the game, the total number of ghost recordings that become available will be much larger than that needed by any one entertainment device. The total number can be reduced by applying one or more of the above factors as a filter to reduce the number of recordings obtained and increase the relevance of the players from whom recordings are obtained, but there may still be a large number.

It will also be appreciated that the ghost recordings held by a server can be ranked and ordered in a similar manner to that described above.

Therefore to further reduce the number of candidate ghost recordings to be considered, optionally the player's recent performance can be used to predict their likely performance in future play (for example their average completion time over the last N attempts may be used as an indicator of expected completion time). Based on this likely performance, a sampling of candidate ghost recordings can be made centred upon the predicted performance (for example centred upon the predicted completion time for the challenge), with a distribution of samples above and below the predicted performance based upon a Gaussian distribution. Where the player has played the challenge a statistically significant number of times, the player's variance in performance can be used to determine variance for the Gaussian distribution.

Hence for example if there are 1,000,000 ghost recordings for a particular race, then the number of candidate ghost recordings for the current player may be reduced to 10,000 by geographical or demographic selection. Then, based upon the player's average performance and variability, 100 ghost recordings may be sampled from that 10,000 with a sampling density that follows the determined Gaussian distribution. It will be appreciated that of these hundred, a certain percentage may be automatically selected because they come from other players who are on the current player's friends list and hence are likely to be people the current player would like to compete against. It will be appreciated that the ghost recordings can include a player ID such as a username of the player whose performance has been recorded, and this player ID can be displayed above the ghost so that the current player can see who they are effectively competing against.

In this way a subset of ghost recordings can be obtained that provide a good number of recordings that are likely to be well matched to the player's expected performance whilst also providing recordings that will be usable if the player's next performance is particularly good or bad.

In an embodiment of the present invention, the sampled subset of ghost recordings is held by the server, and the entertainment device then communicates with the server to select a first and subsequently if needed a second or further ghost recording during play through the challenge, in the manner described previously herein.

In this case, if a current ghost exceeds the first predetermined distance thresholds, the entertainment device sends state data on the current player to the server, and the server performs the selection of a ghost recording according to the preferred or fall-back criteria in the manner described previously herein, and then sends state data on the selected ghost back to the entertainment device, either on an instance-by-instance basis or as a complete ghost recording.

However, it will be appreciated that this relies upon a network link with low latency to provide the responsiveness needed in a racing game or similar.

Accordingly in an embodiment of the present invention the sampled subset of ghost recordings is downloaded as a background activity, for example as soon as a player selects a particular challenge to play. Then the entertainment device can implement the above ghost selection techniques on a locally stored set of ghost recordings supplied by the server. Moreover, the sampled subset of ghost recordings can be downloaded in an order corresponding to the determined Gaussian distribution, so that recordings close to the player's predicted performance are downloaded first, whilst recordings at greater variance to the player's predicted performance are downloaded later. This means is if download speeds are slow, then recordings most likely to be relevant to the player's performance, particularly near the start of a challenge where there has been insufficient time for a large variance in performance to accumulate, are most likely to have been downloaded by the time the challenge starts.

Obtaining and Selecting Ghosts for New Challenges

As noted previously ghost recordings may be obtained from previous attempts by the player themselves, but for new challenges such recordings will not exist, and also no player performance data for the challenge is available.

Again, the developers of the game may provide a range of ghosts for the new challenge, and this range of ghosts is available irrespective of the availability of player performance data.

However, again alternatively or in addition ghosts may be obtained from a server. In this case it was previously proposed that a sampling of ghost recordings is obtained based upon the player's historical performance, but in this case none is available for the new challenge.

However, if the entertainment device or server has obtained historical performance for the player on an existing challenge, then the developers of the game may use empirical data to correlate how performance in the existing challenge corresponds to performance in the new challenge, and thus generate a predicted performance for a challenge that the player has not previously attempted. A sampling of ghost recordings may then be made accordingly, and a ghost recording whose overall performance best matches the predict performance can be selected as the initial ghost. The entertainment device may then proceed as described above during play.

Alternatively, an average initial performance obtained by the server from a plurality of other players of the challenge may be used (for example from players in a demographic and/or geographic subset similar to the player).

Summary

Figure 4:
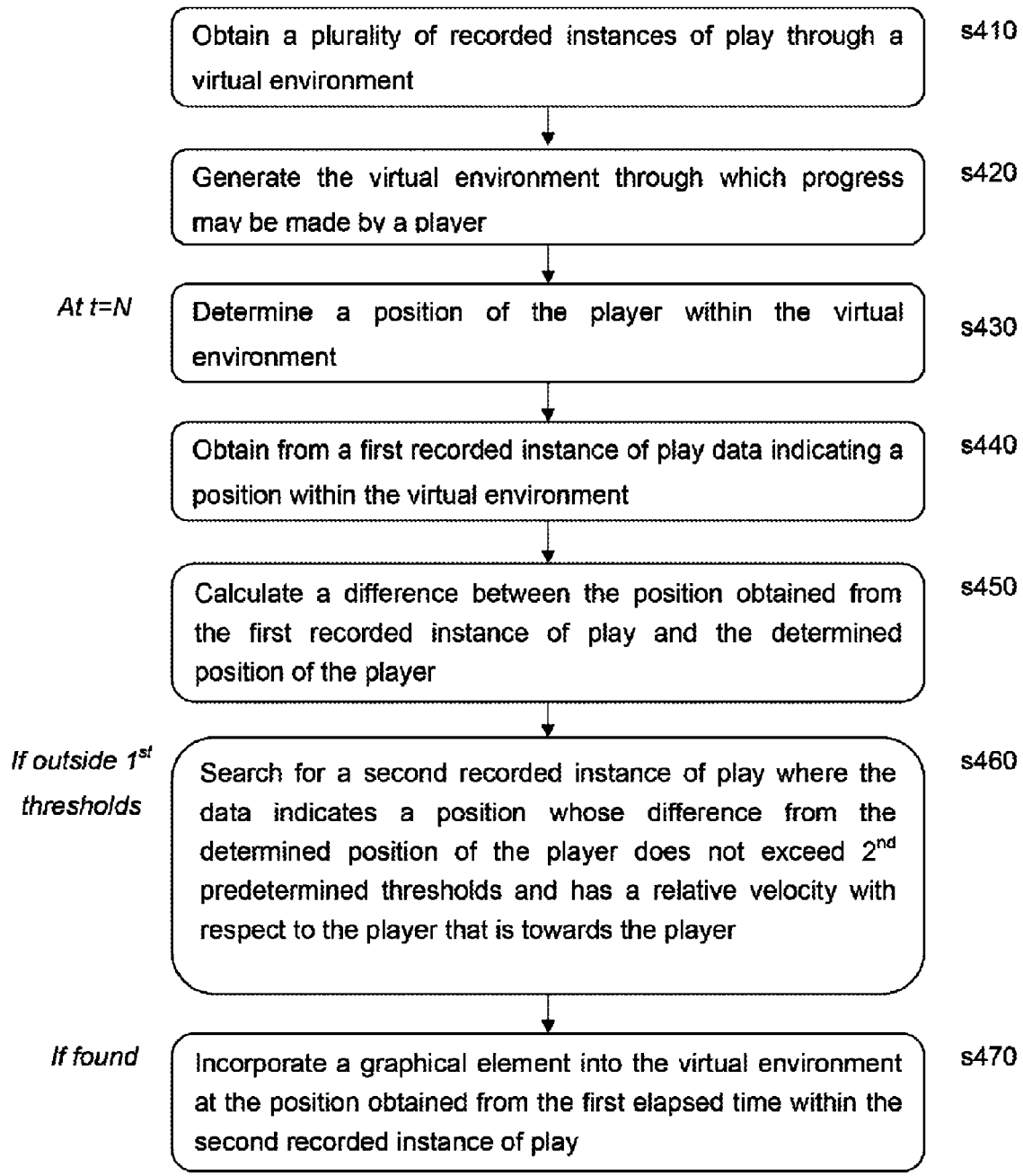
FIG. 4 is a flow diagram of a method of user interaction with entertainment device in accordance with embodiments of the present invention.

Referring now to FIG. 4, in a summary embodiment of the present invention a method of user interaction with an entertainment device comprises:

in a first step s410, obtaining a plurality of recorded instances of play through a virtual environment (i.e. ghost recordings as described herein);

in a second step s420, generating the virtual environment through which progress may be made by a player (such as for example the 'VR Luge' game described herein);

and at a first elapsed time (as a non-limiting example, at time t=N), in a third step s430, determining a position of the player within the virtual environment;

in a fourth step s440, obtaining from a first recorded instance of play (for example the record for the currently displayed ghost), at the first elapsed time within the recording, data indicating a position within the virtual environment;

in a fifth step s450, calculating a difference between the position obtained from the first recorded instance of play and the determined position of the player, and if that difference exceeds first predetermined positive or negative thresholds (e.g. too far in front, or too far behind), then in a sixth step s460 searching for a second recorded instance of play (i.e. a substitute/supplementary ghost) meeting criteria where, at the first elapsed time within the recording, the data indicates a position within the virtual environment whose difference from the determined position of the player does not exceed second predetermined positive or negative thresholds (e.g. not too far in front or behind), and has a relative velocity with respect to the player that is towards the player (e.g. slower if in front, or faster if behind);

and if a second recorded instance of play is found that meets the criteria, then in a seventh step s470 incorporating a graphical element into the virtual environment at the position obtained from the first elapsed time within the second recorded instance of play (i.e. add in the substitute/supplementary ghost).

In an instance of this summary embodiment, if a plurality of recorded instances of play are found that meet the criteria, then the method may comprise selecting as the second recorded instance of play a recorded instance of play in which the data at the first elapsed time indicates a position within the virtual environment that is behind the player with respect to the player's progress, and indicates a speed that is faster than that of the player with respect to the player's progress.

In instance of this summary embodiment, if a plurality of recorded instances of play are found that meet the criteria, but none of the plurality of recorded instances comprises data at the first elapsed time indicates a position within the virtual environment that is behind the player with respect to the player's progress and also indicates a speed that is faster than that of the player with respect to the player's progress, then the method may comprise selecting as the second recorded instance of play a recorded instance of play in which the data at the first elapsed time indicates a position within the virtual environment that is ahead of the player with respect to the player's progress, and indicates a speed that is slower than that of the player with respect to the player's progress.

Hence it can be appreciated that in this summary embodiment preference is given to ghosts that are about to overtake the player rather than those that the player is catching up to. It will be appreciated that where a plurality of ghosts are found that are about overtake the player, further preference can be given to that ghost whose relative speed is slowest, (or within a predetermined speed range), so that when the new ghost becomes visible to the user, its speed with respect to the player appears to be well matched.

In instance of this summary embodiment, if no recorded instances of play are found that meet the criteria described in the above instances, then the method may comprise searching for a second recorded instance of play meeting criteria where, at the first elapsed time within the recording, the data indicates a position within the virtual environment whose difference from the determined position of the player does not exceed third predetermined positive or negative thresholds. Hence in this case the above relative velocity criteria are not used, and the tolerated difference in position may be larger than in previous searches. It will be appreciated that this search may still set a tolerated difference in position that is smaller than the threshold difference in position of the first ghost that is used to trigger the search process, since otherwise the net effect will be to introduce a ghost that is further away than the one it is replacing. Optionally, if a plurality of ghosts are found in this way then preferably the ghost in front of the player with the lowest speed (which will still be faster than the current player, given that this ghost was not found using the previous search criteria) may be selected.

In an instance of this summary embodiment, the step of searching for a second recorded instance of play may comprise obtaining position values for a plurality of recorded instances of play at the first elapsed time within each respective recording, and calculating for which recorded instances of play the difference between the respective obtained position values and the player's position within first predetermined positive or negative thresholds as appropriate; and for those recorded instances of play where the difference is within the first predetermined positive or negative threshold, then obtain the current speed of the player, obtain speed values at the first elapsed time, and calculate the relative velocity between the current speed the player and the obtained speed values, and calculate for which recorded instances of play the relative velocity with respect to the player is towards the player; and for those recorded instances of play where the relative velocity with respect to the player is towards the player, select one recorded instance of play to be the second recorded instance of play.

In this case, if there is a plurality of recorded instances of play where the relative velocity with respect to the player is towards the player, then the method may comprise selecting one of the plurality of recorded instances of play where the relative velocity is less than a predetermined threshold relative velocity. This helps to prevent the selection of ghosts that for example may rapidly overtake the user and disappear into the distance, thereby placing the user in the same frustrating position they were in before, and triggering yet another ghost recording search.

In an instance of this summary embodiment, a plurality of recorded instances of play are included in association with the virtual environment, and for a performance measure associated with a virtual environment, the plurality of recorded instances of play correspond to a distribution of performance measures across a predetermined range.

Figure 5:
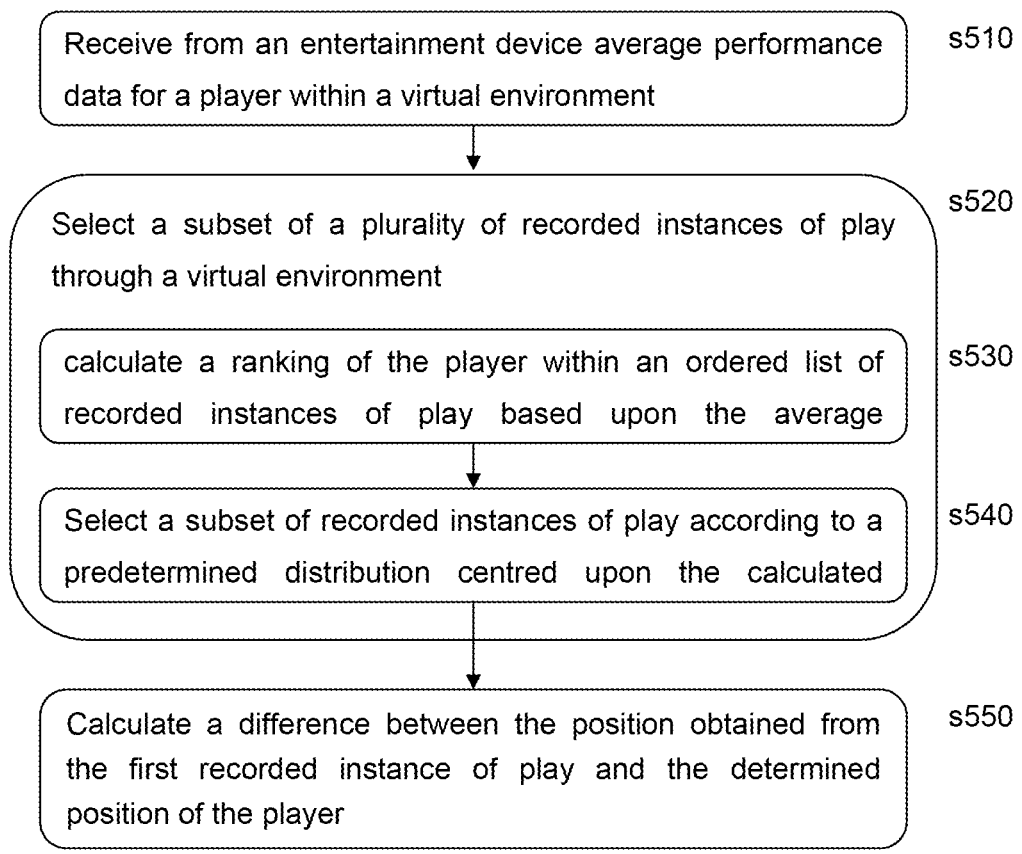
FIG. 5 is a flow diagram of a method of selecting a plurality of recorded instances of play at a server for interaction with a user at an entertainment device in accordance with embodiments of the present invention.

Referring now also to FIG. 5, in a summary embodiment of the present invention, a method of selecting a plurality of recorded instances of play at a server comprises:

in a first step s510, receiving from an entertainment device average performance data for a player within a virtual environment;

in a second step s520, selecting a subset of a plurality of recorded instances of play through a virtual environment; and in a fifth step s550, transmitting to the entertainment device data corresponding to the subset of the plurality of recorded instances;

wherein the step of selecting a subset of the plurality of recorded instances of play to the virtual environment comprises:

in a first sub-step s530, calculating a ranking of the player within an ordered list of recorded instances of play based upon the average performance data; and in a second sub-step s540, selecting a subset of recorded instances of play according to a predetermined distribution centred upon the calculated ranking.

In an instance of this summary embodiment, the step of selecting a subset of the plurality of recorded instances of play to the virtual environment may comprise filtering the plurality of recorded instances according to one or more of the following:

i. the network proximity to the player of where a recorded instance was recorded;

ii. the geographical proximity to the player of where a recorded instance was recorded;

iii. a demographic parameter shared by the player and a person whose performance is recorded in a recorded instance of play; and iv. whether the person whose performance is recorded in a recorded instance of play is on the player's friends list.

In an instance of this summary embodiment in which the average performance data for the player corresponds to a first virtual environment, and the entertainment device requests a subset of a plurality recorded instances of play through a second virtual environment, the method may comprise obtaining a performance ranking in the second virtual environment that has an established correlation with a performance ranking calculated for the player for the first virtual environment based upon the average performance data; and selecting a subset of recorded instances of play for the second virtual environment according to a predetermined distribution centred upon the calculated performance ranking in the second virtual environment.

In instance of this summary embodiment, the step of transmitting to the entertainment device data corresponding to the subset of the plurality of recorded instances may comprise placing the plurality of recorded instances in a transmission order responsive to their proximity in rank to the calculated ranking of the player.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

In a summary embodiment of the present invention, conventional hardware suitably adapted as applicable by software instruction comprises an entertainment device that in turn comprises memory means operable to store a plurality of recorded instances of play through a virtual environment, and graphics processing means operable to generate the virtual environment, through which progress may be made by a player; and at a first elapsed time, a position determination means is operable to determine a position of the player within the virtual environment, a data retrieval means is operable to obtain from a first recorded instance of play, at the first elapsed time within the recording, data indicating a position within the virtual environment, and a calculating means operable to calculate a difference between the position obtained from the first recorded instance of play and the determined position of the player; and if that difference exceeds first predetermined positive or negative thresholds, then a search means is operable to search for a second recorded instance of play meeting criteria where, at the first elapsed time within the recording, the data indicates a position within the virtual environment whose difference from the determined position of the player does not exceed second predetermined positive or negative thresholds, and has a relative velocity with respect to the player that is towards the player; and if a second recorded instance of play is found that meets the criteria, then the graphics processing means is operable to incorporate a graphical element into the virtual environment at the position obtained from the first elapsed time within the second recorded instance of play.

In an instance of this summary embodiment, if a plurality of recorded instances of play are found that meet the criteria, then the search means is operable to select as the second recorded instance of play a recorded instance of play in which the data at the first elapsed time indicates a position within the virtual environment that is behind the player with respect to the player's progress, and indicates a speed that is faster than that of the player with respect to the player's progress.

In a summary embodiment of the present invention, conventional hardware suitably adapted as applicable by software instruction comprises a server that in turn comprises a receiver operable to receive from an entertainment device average performance data for a player within a virtual environment, a selection means (such as a CPU of the server) operable to select a subset of a plurality of recorded instances of play through a virtual environment, and a transmitter operable to transmit the entertainment device data corresponding to the subset of the plurality of recorded instances; and in which the selection means is operable to calculate a ranking of the player within an ordered list of recorded instances of play based upon the average performance data, and select a subset of recorded instances of play according to a predetermined distribution centred upon the calculated ranking.

INDUSTRIAL APPLICABILITY

It will be appreciated that the above described techniques and apparatus provide the ability to select suitable ghost avatars in response to the variable performance of the user during the completion of a challenge, so as to provide entertaining and relevant visible competition during play.

However it will be understood that the techniques described herein are independent of any scheme, rule or method of playing the game itself; for example the above techniques for substituting ghosts remain the same whether or not the player races on land air or sea, or indeed has to race at all, or whether the player has to reach certain waypoints in a challenge within a particular time to proceed further, or is penalised in any particular way for veering off course, or whether the player has to collect certain items or avoid certain hazards, or how any of these behaviours are scored or affect the outcome of the game. Hence it will be clear that the above described techniques themselves do not constitute a scheme rule or method of playing a game as such.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of user interaction with an entertainment device, comprising the steps of:
   obtaining a plurality of recorded instances of play through a virtual environment;
   generating, by one or more processors, the virtual environment, through which progress may be made by a player;
   and at a first elapsed time, determining a position of the player within the virtual environment;

obtaining from a first recorded instance of play, at the first elapsed time within the recording, data indicating a position within the virtual environment;

calculating, by the one or more processors, a difference between the position obtained from the first recorded instance of play and the determined position of the player, and if the difference exceeds first predetermined positive or negative thresholds, then:

searching for a second recorded instance of play meeting criteria where, at the first elapsed time within the recording, the data indicates a position within the virtual environment whose difference from the determined position of the player does not exceed second predetermined positive or negative thresholds, and has a relative velocity with respect to the player that is towards the player;

and if a second recorded instance of play is found that meets the criteria, then:

incorporating, by the one or more processors, a graphical element into the virtual environment at the position obtained from the first elapsed time within the second recorded instance of play.

2. The method of user interaction according to claim 1, in which if a plurality of recorded instances of play are found that meet the criteria, then the method comprises the step of:

selecting as the second recorded instance of play a recorded instance of play in which the data at the first elapsed time indicates a position within the virtual environment that is behind the player with respect to the player's progress, and indicates a speed that is faster than that of the player with respect to the player's progress.

3. The method of user interaction according to claim 1, in which if a plurality of recorded instances of play are found that meet the criteria, but none of the plurality of recorded instances comprises data at the first elapsed time that indicates a position within the virtual environment that is behind the player with respect to the player's progress and also indicates a speed that is faster than that of the player with respect to the player's progress, then the method comprises the step of:

selecting as the second recorded instance of play a recorded instance of play in which the data at the first elapsed time indicates a position within the virtual environment that is ahead of the player with respect to the player's progress, and indicates a speed that is slower than that of the player with respect to the player's progress.

4. The method of user interaction according to claim 1, in which if no recorded instances of play are found that meet the criteria, then the method comprises the steps of:

searching for a second recorded instance of play meeting criteria where, at the first elapsed time within the recording, the data indicates a position within the virtual environment whose difference from the determined position of the player does not exceed third predetermined positive or negative thresholds.

5. The method of user interaction according to claim 1, in which the step of searching for a second recorded instance of play comprises the steps of:

obtaining position values for a plurality of recorded instances of play at the first elapsed time within each respective recording;

calculating for which recorded instances of play the difference between the respective obtained position values and the player's position within first predetermined positive or negative thresholds as appropriate, and for those recorded instances of play where the difference is within the first predetermined positive or negative threshold:

obtaining a current speed of the player;

obtaining speed values at the first elapsed time, and calculate the relative velocity between the current speed of the player and the obtained speed values;

calculating for which recorded instances of play the relative velocity with respect to the player is towards the player; and for those recorded instances of play where the relative velocity with respect to the player is towards the player, selecting one recorded instance of play to be the second recorded instance of play.

6. The method of user interaction according to claim 5, in which if there is a plurality of recorded instances of play where the relative velocity with respect to the player is towards the player, then the method comprises the step of:

selecting one of the plurality of recorded instances of play where the relative velocity is less than a predetermined threshold relative velocity.

7. The method of user interaction according to claim 1 in which the plurality of recorded instances of play are included in association with the virtual environment, and for a performance measure associated with the virtual environment, the plurality of recorded instances of play correspond to a distribution of performance measures across a predetermined range.

8. A method of selecting a plurality of recorded instances of play at a server for interaction with a user at an entertainment device, the method comprising the steps of:

receiving from an entertainment device average performance data for a player within a virtual environment;

selecting, by one or more processors, a subset of a plurality of recorded instances of play through the virtual environment; and transmitting to the entertainment device data corresponding to the subset of the plurality of recorded instances;

wherein the step of selecting a subset of the plurality of recorded instances of play to the virtual environment comprises the steps of:

calculating a ranking of the player within an ordered list of recorded instances of play based upon the average performance data; and selecting a subset of recorded instances of play according to a predetermined distribution centred upon the calculated ranking.

9. A method of selecting a plurality of recorded instances of play according to claim 8, wherein the step of selecting a subset of the plurality of recorded instances of play to the virtual environment comprises the step of:

filtering the plurality of recorded instances according to one or more of the following:

i. network proximity to the player of where a recorded instance was recorded;

ii. geographical proximity to the player of where a recorded instance was recorded;

iii. a demographic parameter shared by the player and a person whose performance is recorded in a recorded instance of play; and iv. whether the person whose performance is recorded in a recorded instance of play is on a friends list of the player.

10. A method of selecting a plurality of recorded instances of play according to claim 8, in which the average performance data for the player corresponds to a first virtual environment, and the entertainment device requests a subset of a plurality recorded instances of play through a second virtual environment, the method comprising the steps of:
   obtaining a performance ranking in the second virtual environment that has an established correlation with a performance ranking calculated for the player for the first virtual environment based upon the average performance data; and
   selecting a subset of recorded instances of play for the second virtual environment according to a predetermined distribution centred upon the calculated performance ranking in the second virtual environment.

11. A method of selecting a plurality of recorded instances of play according to claim 8, in which the step of transmitting to the entertainment device data corresponding to the subset of the plurality of recorded instances comprises a sub-step of:
   placing the plurality of recorded instances in a transmission order responsive to their proximity in rank to the calculated ranking of the player.

12. A non-transitory computer program product storing computer-readable instructions thereon, the instructions, when executed by one or more processors, perform a method of user interaction with an entertainment device, comprising:
   obtaining a plurality of recorded instances of play through a virtual environment;
   generating the virtual environment, through which progress may be made by a player;
   and at a first elapsed time,
   determining a position of the player within the virtual environment;
   obtaining from a first recorded instance of play, at the first elapsed time within the recording, data indicating a position within the virtual environment;
   calculating a difference between the position obtained from the first recorded instance of play and the determined position of the player,
   and if the difference exceeds first predetermined positive or negative thresholds, then:
      searching for a second recorded instance of play meeting criteria where, at the first elapsed time within the recording, the data indicates a position within the virtual environment whose difference from the determined position of the player does not exceed second predetermined positive or negative thresholds, and has a relative velocity with respect to the player that is towards the player;
      and if a second recorded instance of play is found that meets the criteria, then:
         incorporating a graphical element into the virtual environment at the position obtained from the first elapsed time within the second recorded instance of play.

13. An entertainment device, comprising
   memory means operable to store a plurality of recorded instances of play through a virtual environment;
   graphics processing means operable to generate the virtual environment, through which progress may be made by a player;
   and for a first elapsed time,
   position determination means operable to determine a position of the player within the virtual environment;
   data retrieval means operable to obtain from a first recorded instance of play, at the first elapsed time within the recording, data indicating a position within the virtual environment;
   calculating means operable to calculate a difference between the position obtained from the first recorded instance of play and the determined position of the player,
   and if the difference exceeds first predetermined positive or negative thresholds, then
      search means operable to search for a second recorded instance of play meeting criteria where, at the first elapsed time within the recording, the data indicates a position within the virtual environment whose difference from the determined position of the player does not exceed second predetermined positive or negative thresholds, and has a relative velocity with respect to the player that is towards the player;
      and if a second recorded instance of play is found that meets the criteria, then
         the graphics processing means is operable to incorporate a graphical element into the virtual environment at the position obtained from the first elapsed time within the second recorded instance of play.

14. An entertainment device according to claim 13, in which if the plurality of recorded instances of play are found that meet the criteria, then the search means is operable to select as the second recorded instance of play a recorded instance of play in which the data at the first elapsed time indicates a position within the virtual environment that is behind the player with respect to the player's progress, and indicates a speed that is faster than that of the player with respect to the player's progress.

15. A server, comprising:
   a receiver operable to receive from an entertainment device average performance data for a player within a virtual environment;
   selection means operable to select a subset of a plurality of recorded instances of play through the virtual environment; and
   a transmitter operable to transmit the entertainment device data corresponding to the subset of the plurality of recorded instances;
   and in which the selection means is operable to:
      calculate a ranking of the player within an ordered list of recorded instances of play based upon the average performance data; and
      select a subset of recorded instances of play according to a predetermined distribution centred upon the calculated ranking.

16. A non-transitory computer program product storing computer-readable instructions thereon, the instructions, when executed by one or more processors, perform a method of selecting a plurality of recorded instances of play at a server for interaction with a user at an entertainment device, the method comprising:
   receiving from an entertainment device average performance data for a player within a virtual environment;
   selecting a subset of a plurality of recorded instances of play through the virtual environment; and
   transmitting to the entertainment device data corresponding to the subset of the plurality of recorded instances;
   wherein the step of selecting a subset of the plurality of recorded instances of play to the virtual environment comprises the steps of:

calculating a ranking of the player within an ordered list of recorded instances of play based upon the average performance data; and selecting a subset of recorded instances of play according to a predetermined distribution centred upon the calculated ranking.

* * * * *